US007360902B2

(12) United States Patent
Penn et al.

(10) Patent No.: US 7,360,902 B2
(45) Date of Patent: Apr. 22, 2008

(54) SYSTEM AND METHOD FOR LIGHT SOURCE MODULATION

(75) Inventors: Steven M. Penn, Plano, TX (US); Dana F. Segler, Jr., Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 133 days.

(21) Appl. No.: 10/994,005

(22) Filed: Nov. 19, 2004

(65) Prior Publication Data

US 2006/0109434 A1 May 25, 2006

(51) Int. Cl.
*G03B 21/28* (2006.01)
*G03B 21/26* (2006.01)
*G03B 21/20* (2006.01)
*G03B 21/00* (2006.01)
*F21V 5/00* (2006.01)

(52) U.S. Cl. ........................... 353/30; 353/33; 353/37; 353/81; 353/102; 353/121; 362/337; 362/339

(58) Field of Classification Search ................. 353/20, 353/31, 33, 34, 37, 69, 81, 84, 99, 102, 121, 353/97, 30, 122; 349/5, 7, 9; 348/742, 743; 359/443, 460, 448, 449; 362/337, 339, 290

See application file for complete search history.

(56) References Cited

U.S. PATENT DOCUMENTS

| | | | | |
|---|---|---|---|---|
| 5,626,411 | A * | 5/1997 | Takahashi et al. | 353/94 |
| 5,984,478 | A * | 11/1999 | Doany et al. | 353/84 |
| 6,578,968 | B1 * | 6/2003 | Bierhuizen et al. | 353/30 |
| 6,614,462 | B1 * | 9/2003 | Donner et al. | 347/239 |
| 6,700,599 | B2 * | 3/2004 | Donner et al. | 347/239 |
| 6,726,332 | B2 * | 4/2004 | Cannon et al. | 353/33 |
| 6,801,238 | B2 * | 10/2004 | Donner et al. | 347/239 |
| 7,102,833 | B2 * | 9/2006 | Cole et al. | 359/738 |
| 7,128,420 | B2 * | 10/2006 | Kapellner et al. | 353/38 |
| 7,180,671 | B2 * | 2/2007 | Cho | 359/621 |

OTHER PUBLICATIONS

Hewlett, Gregory J., et al., U.S. Appl. No. 10/753,838, entitled “Filter Design Techniques for Neutral Density Color Wheels,” filed Jan. 7, 2004.

* cited by examiner

*Primary Examiner*—Melissa Jan Koval
(74) *Attorney, Agent, or Firm*—Wade James Brady, III; Frederick J. Telecky, Jr.

(57) ABSTRACT

In one embodiment, a method for modulating light in an image display system includes generating a plurality of light beams. The amount of light beams that are received by a modulator is selectively varied, and the modulated light beams are received at the modulator.

24 Claims, 4 Drawing Sheets

START
502
RECEIVE IMAGE DATA
504
DETERMINE TARGET POSITION FOR OPTICAL ELEMENT
506
POSITION OPTICAL ELEMENT
508
TRANSMIT LIGHT BEAMS THROUGH OPTICAL ELEMENT
510
RECEIVE LIGHT BEAMS AT MODULATOR
RECEIVE NEW IMAGE DATA?
NO
END
512
YES
514
DETERMINE TARGET POSITION
TARGET POSITION DIFFERENT FROM CURRENT POSITION?
NO
516
YES

SYSTEM AND METHOD FOR LIGHT SOURCE MODULATION

TECHNICAL FIELD OF THE INVENTION

This invention relates in general to image display systems, and more particularly to optical systems implementing micro-mirror based projection display systems.

BACKGROUND

Spatial light modulators used in projection display systems are capable of projecting image details from media sources such as HDTV, DVD, and DVI. The light received by a spatial light modulator and used to produce image details is emitted from one or more light sources. Minimum voltage requirements for operating conventional light sources prevents the modulation of the light at the light source. Specifically, a light source requires a minimum current for operation. If the current drops below the minimum threshold current, the light source may extinguish itself. Thus, conventional light sources are limited in their ability to modulate light at frequencies for sufficient grayscale resolution at high contrast ratios. Accordingly, images with a high content of black levels may result in projected images that include non-uniform shades of color intensity and objectionable contour lines at the transition between one area of darkness and an adjacent area of slightly different darkness.

SUMMARY OF THE INVENTION

In one embodiment, a method for modulating light in an image display system includes generating a plurality of light beams. The amount of light beams that are received by a modulator is selectively varied, and the modulated light beams are received at the modulator.

Depending on the specific features implemented, particular embodiments of the present invention may exhibit some, none, or all of the following technical advantages. A technical advantage may be that an optical element may be used to modulate projection light emitted by a light source. For example, the amount of projection light received from a light source by an integrator rod may be varied. Another technical advantage may be that the brightness and contrast of the projected image may be adjusted. For example, the optical element may be manipulated to lower the black level associated with an optical beam to produce darker images. As a result, gray-level contour artifacts may be reduced by providing additional levels of grayscale intensity. Another technical advantage may be that the brightness and contrast of the projected image may be varied on a frame-by-frame basis or on a multiple frame-by-multiple frame basis.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Figure 1:
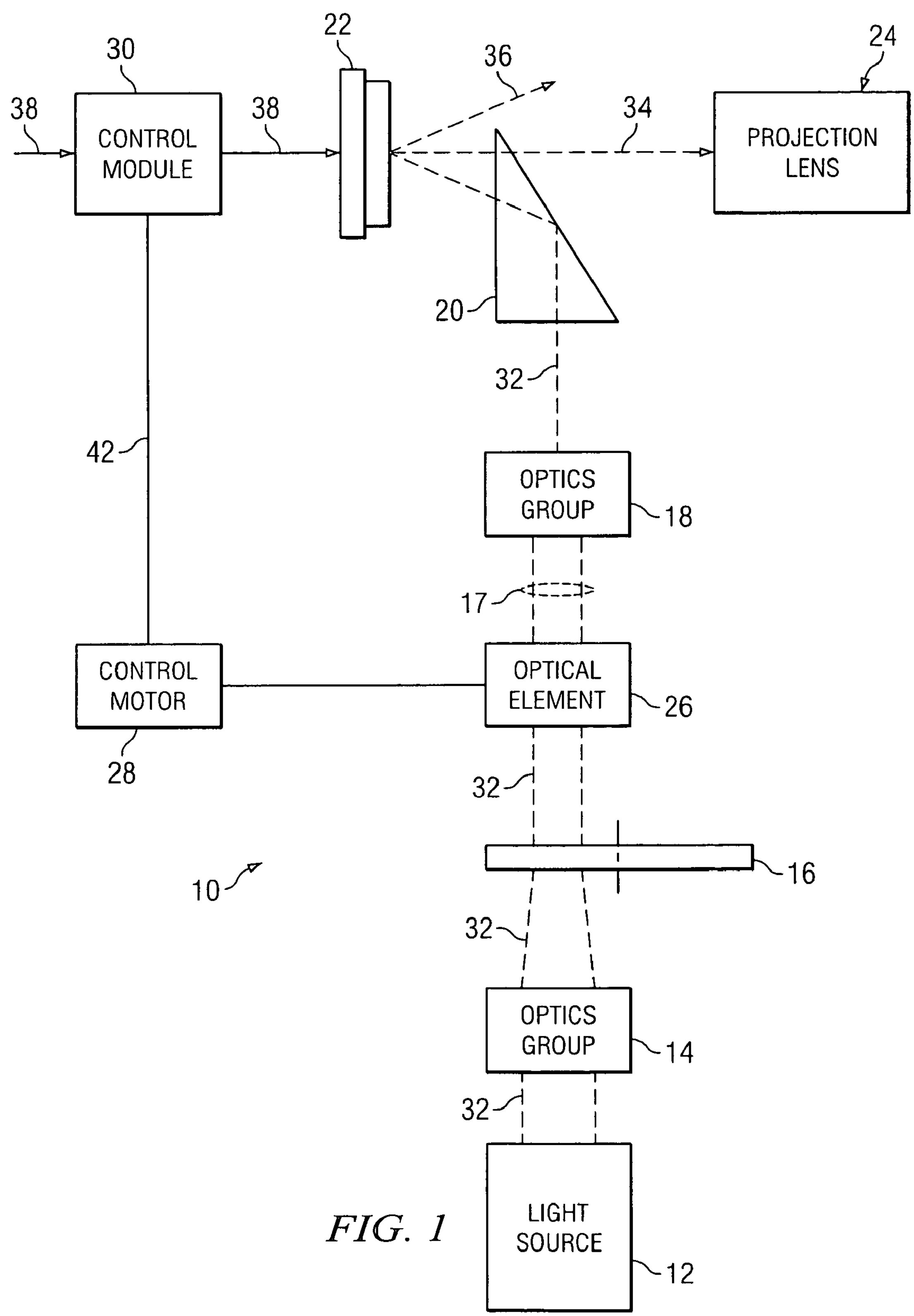
FIG. 1 is a block diagram of one embodiment of a portion of a projection display system implementing an optical element for modulating light from a source.

FIG. 1 is a block diagram of one embodiment of a portion of a projection display system 10 implementing an adjustable optical element 26. In this example, projection display system 10 includes a light source 12 capable of generating an illumination light beam and a first optics group 14 capable of focusing the illumination light beam on an entrance pupil of an integration rod 17. Light source 12 may comprise any light source, such as, for example, a metal halide light source or a xenon arc light source. First optics group 14 may comprise a condenser lens and/or any other suitable optical device. As will be described in more detail below, light emitted from light source 12 may be modulated using optical element 26. Modulation of projection light may enable the generation of images with a high content of black levels and sufficient grayscale resolution at high contrast ratios.

In the illustrated embodiment, the illumination light beam passes through a color wheel 16 before entering integration rod 17. Color wheel 16 may comprise any device capable of modulating one of the primary colors (e.g., red, green, and blue), in the path of the illumination light beam. For example, color wheel 16 may comprise a scrolling color wheel or other type of recycling color wheel. Color wheel 16 enables the illumination light beam to be filtered so as to provide "field sequential" images. Color wheel 16 enables system 10 to generate a sequence of differently colored images that are perceived by a viewer through a projection lens 24 as a correctly colored image.

In this example, system 10 also includes a second optics group 18 capable of receiving the illumination light beam passing through integration rod 17 and capable of focusing the illumination light beam onto a modulator 22 through a prism assembly 20. Second optics group 18 may comprise, for example, a condenser lens and/or any other suitable optical device. Modulator 22 may comprise any device capable of selectively communicating at least some of the illumination light beam along a projection light path 34 and/or along an off state light path 36. In various embodiments, modulator 22 may comprise a spatial light modulator, such as, for example, a liquid crystal display or a light emitting diode modulator.

In a particular embodiment, modulator 22 comprises a digital micro-mirror device (DMD). The DMD is a micro electro-mechanical device comprising an array of hundreds of thousands of tilting micro-mirrors. In a flat state, each micro-mirror may be substantially parallel to projection lens 24. From the flat state, the micro-mirrors may be tilted, for example, to a positive or negative angle to alternate the micro-mirrors between an "on" state and an "off" state. For discussion purposes, the angle at which the mirrors may tilt will be measured from projection path 34 and may be designated as theta. In particular embodiments, the micro-mirrors may tilt from +10 degrees to a −10 degrees. In other embodiments, micro-mirrors may tilt from a +12 degrees to a −12 degrees. To permit the micro-mirrors to tilt, each micro-mirror attaches to one or more hinges mounted on support posts, and spaced by means of an air gap over underlying control circuitry. The control circuitry provides electrostatic forces, based at least in part on image data 38 received from a control module 30. In various embodiments, modulator 22 is capable of generating various levels or shades for each color received and may be capable of generating approximately 256 levels or shades. In this example, color level "0" represents the darkest shade and color level "255" represents the brightest shade.

The electrostatic forces cause each micro-mirror to selectively tilt. Incident illumination light on the micro-mirror array is reflected by the "on" micro-mirrors along projection path 34 for receipt by projection lens 24 and is reflected by the "off" micro-mirrors along off state light path 36 for receipt by a light dump (not shown). The pattern of "on" versus "off" mirrors (e.g., light and dark mirrors) forms an image that is projected by projection lens 24. As used in this document, the terms "micro-mirrors" and "pixels" are used inter-changeably.

In the illustrated embodiment, display system 10 includes at least one adjustable optical element 26. An example embodiment of optical element 26 is described in more detail with regard to FIG. 3. Returning to FIG. 1, system 10 positions adjustable optical element 26 along an illumination path 32. Adjustable optical element 26 is positioned between the light source 12 and integrator rod 17. In a preferred embodiment, adjustable optical element 26 is positioned between light source 12 and color wheel 16. In another embodiment, adjustable optical element 26 is positioned between color wheel 16 and integrator rod 17. In various embodiments, adjustable optical element 26 can be controlled or manipulated to modulate the light generated by light source 12. Specifically, the light generated by light source 12 may be modulated by varying the amount of light received at integrator rod 17 and, thus, modulator 22. The modulation range of light received at integrator rod 17 may vary between a maximum intensity, which is a function of the capabilities of light source 12, and a minimum intensity, which is a function of the requirements of the image data. Accordingly, optical element 26 may prevent all light or a portion of light from entering the integrator rod 17.

Because adjustable optical element 26 selectively varies the amount of light received at integrator rod 17, adjustable optical element 26 operates to supplement the modulation function of modulator 22 by selectively varying the amount of projection light communicated to modulator 22. Varying the amount of projection light communicated to modulator 22 can advantageously adjust brightness and/or contrast of the projected image. For example, for a bright scene, adjustable optical element 26 may be positioned to make optimal use of the available amount of the projection light communicated from light source 12. Likewise, for darker scenes, optical element 26 may be positioned to proportionally reduce the amount of the "on" state light communicated to modulator 22 and to increase the contrast ratio of the projected image. In some cases, optical element 26 can vary the brightness and contrast of the projected image on a frame-by-frame or a multiple frame basis.

One aspect of this disclosure recognizes that selectively varying the amount of projection light communicated to modulator 22 can reduce gray-level contour artifacts by providing additional levels of grayscale intensity. Moreover, selectively varying the amount of projection light communicated to modulator 22 can improve the contrast ratio of system 10 by reducing the black level associated with an image communicated to modulator 22. The term "black level" refers to the light level when the micro-mirrors or pixels are in the "off" state position.

In various embodiments, adjustable optical element 26 can selectively vary the intensity of the projection light based on image data 38 and/or an ambient room environment. In most cases, optical element 26 can selectively vary the amount of projection light on a frame-by-frame basis. The term "frame" refers to a complete image displayed by the spatial light modulator and represented by a set of display data. Image data 38 may comprise, for example, an image content, a color content, an integrated intensity of the image frame, a peak to peak intensity value of the image frame, and/or a subjectively weighted area, such as the center of the image. In some embodiments, image data 38 can comprise data compiled from analyzed histogram data.

In other embodiments, adjustable optical element 26 can selectively vary the intensity of the projection light while maintaining a relatively constant contrast. In other words, optical element 26 can lower or raise both the lowest gray-scale level and the highest gray-scale level, while maintaining a desired separation (e.g., contrast) between the highest and lowest gray-scale levels.

In still other embodiments, adjustable optical element 26 can operate to selectively vary the amount of projection light communicated to integrator rod 17 and, thus, modulator 22 at a frequency that can be faster than the modulation cycle or pulse time of modulator 22. Adjusting the position of optical element 26 at a rate faster than a modulation rate of modulator 22 advantageously enables system 10 to enhance further the gray-scale resolution and/or contrast of a projected image.

In this example, system 10 includes control module 30 capable of controlling the position of optical element 26. Control module 30 operates to control the position of optical element 26 based at least in part on image data 38 received from a communication device (not explicitly shown). In this particular embodiment, control module 30 generates a control signal 42 according to an image intensity algorithm that analyzes image data 38 received from the communication device.

In this example, a control motor 28 receives control signal 42 and selectively manipulates adjustable optical element 26 to vary the amount of projection light transmitted along illumination path 32. In this example, control motor 28 comprises a trapezoidal voice coil motor. In other embodiments, control motor 28 may comprise, for example, a fast-acting linear actuator, a galvanometer type actuator, or a rotary actuator. In a particular embodiment, control motor 28 may be capable of approximately 256 step changes. In other embodiments, control motor 28 may be capable of approximately 128 step changes.

In this particular embodiment, control module 30 includes a histogram that collects data associated with image data 38 and determines a target position of optical element 26 based at least in part on the histogram. The histogram operates to tally or count the number of pixels, for each frame, having their maximum intensity component (e.g., the red, green, or blue component) at a particular color level (e.g., 0-255). In some cases, the image intensity algorithm determines an appropriate "step size" for optical element 26 based at least in part on the target position and the actual position of optical element 26. As used in the document, the term "step size" refers to the speed at which optical element 26 moves toward its target position. In most cases, the smaller the "step size" the slower optical element 26 moves toward its target position.

In other embodiments, control module 30 determines the target position based on the histogram and a maximum number of pixels a manufacturer is willing to clip. The term "clip" and "clipped" refers to a pixel or micro-mirror having a color value that exceeds the maximum color level (e.g., 255) after amplification of the image data. In various embodiments, system manufacturers can set the maximum number of clipped pixels to, for example, ¼ or ½ of one percent of the total number of pixels associated with modulator 22. In some cases, a system manufacturer can set the maximum number of clipped pixels to between 2,000 and 6,000 pixels. In a particular example embodiment, the maximum number of clipped pixels is set to 4096.

Control module 30 determines the target position by counting, starting in bin "31," the number of pixels until control module 30 determines the bin that contains the pixel that is the maximum number of clipped pixels. For example, if the maximum number of clipped pixels is set to 2048 and bin "31" has 500 pixels, bin "30" has 500 pixels, bin "29" has 800 pixels, and bin "28" has 600 pixels, then control module 30 determines that bin "28" has the $2048^{th}$ pixel. In that case, control module 30 sets the target aperture to the aperture position associated with bin "28" to ensure that the maximum number of clipped pixels is not exceeded. As used in this document, the term "bin" refers to any suitable storage medium or memory.

In this example, control module 30 is capable of amplifying image data 38 before communicating image data 38 to modulator 22. In this particular embodiment, control module 30 determines the amount of gain to apply to image data 38 according to the image intensity algorithm that controls the position of optical element 26. In some cases, the image intensity algorithm determines a new position for optical element 26 based at least in part on a target position and a "step size" for optical element 26. The image intensity algorithm then determines an appropriate gain to apply to image data 38 based at least in part on the new position of optical element 26.

One aspect of this disclosure recognizes that by amplifying image data 38 and controlling the position of optical element 26, system 10 can increase the number of effective color levels received by modulator 22. For example, if the image intensity algorithm positions 26 such that optical element 26 reduces the projection light by 75% and, as a result, applies a gain of four to image data 38, then system 10 can use approximately four times as many levels to reproduce the scene. Controlling the position of optical element 26 and amplifying image data 38 is particularly advantageous for darker color levels (e.g., levels 0-127). Moreover, amplifying image data 38 and selectively varying the amount of projection light communicated to modulator 22 can improve the contrast ratio of system 10 by reducing the black level associated with an image communicated from modulator 22 to projection lens 24.

In other embodiments, control module 30 can adjust the color of a clipped pixel associated with image data 38 after amplification by applying a hue correction algorithm before communicating image data 38 to modulator 22. In most cases, a clipped pixel will result in a color having a substantially different hue and, as a result, a different color. In one example, image data 38 may desire to project a gray-blue color (e.g., a red level of 128, a green level of 128, and a blue level of 255) for a particular pixel. In that example, if control module 30 applies a gain of two, the projected color will be a white color (e.g., each of the red, green, and blue levels will have a value of 255). To minimize the impact of clipped pixels, control module 30 may implement, in a particular embodiment, a hue correction algorithm that ensures system 10 maintains the amplified image data 38 associated with the clipped pixel in the desired hue.

One aspect of this disclosure recognizes that applying a hue correction algorithm to the clipped pixels can result in an improved image displayed or projected from system 10. That is, the hue correction algorithm allows the clipped pixels to have a relatively natural look, when compared to the rest of the projected image, instead of the highly desaturated look that results from clipped pixels. Although the hue correction algorithm may be applied within system 10 in this example, the hue correction algorithm disclosed herein may be applicable to any system having an adjustable contrast.

In the illustrated embodiment, system 10 includes an adjustable optical element 26 positioned between color wheel 16 and integrator rod 17. In other embodiments, system 10 may include an adjustable optical element 26 positioned at any point along illumination path 32 prior to integrator rod 17. Thus, in some embodiments, system 10 may include an adjustable optical element 26 positioned between light source 12 and first optics group 14. In other embodiments, system 10 may include an adjustable optical element 26 positioned between first optics group 14 and color wheel 16. Furthermore, it is also recognized that, in various embodiments, system 10 may not include each and every element described above in the optical system of system 10. For example, where light source 12 includes an array of light emitting diodes (LEDs) emitting sequential colors of light, the optical system of system 10 may not include a color wheel 16 and/or a first optics group 14.

Figure 2:
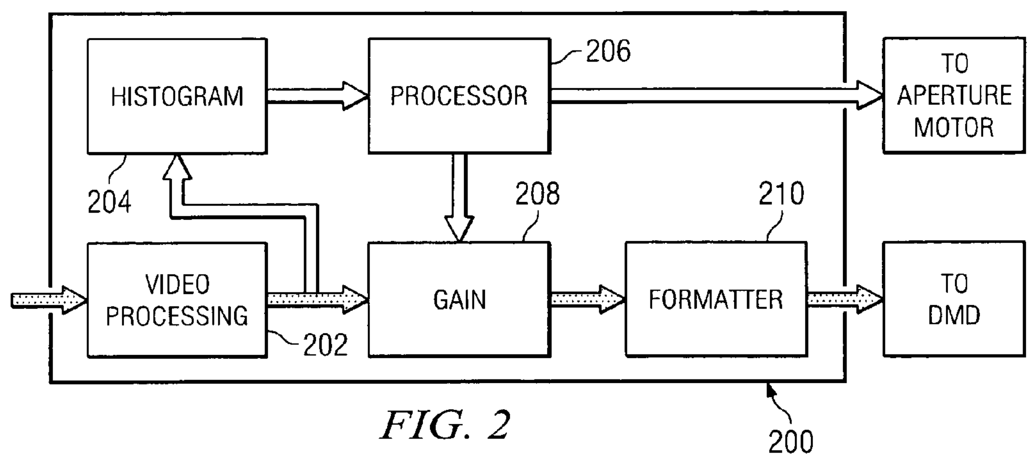
FIG. 2 is a block diagram of a control module capable of adjusting a position of an optical element and of determining a desired gain for image data.

FIG. 2 is a block diagram of a control module 200 capable of adjusting a position of an optical element 26 and of determining a desired gain for image data. In various embodiments, the structure and function of control module 200 can be substantially similar to control module 30 of FIG. 1. In this example, control module 200 includes a video processing module 202 capable of processing (e.g., converting the signal to red, green, and blue) a digital signal received from a communication source. Video processing module 202 may also be capable of converting the input signal to a linear scale for use by other modules within control module 200. In other embodiments, video processing module 202 may have access to or include a decoding module capable of decoding a digital signal before processing. In some embodiments, video processing module 202 may have access to or include a decoding module capable of converting an analog signal to digital format. In this particular embodiment, processing module 202 operates to process the received signal on a frame-by-frame basis.

Video processing module 202 communicates the processed signal to a histogram module 204. Histogram module 204 operates to tally or count the number of pixels, for each frame associated with the processed signal, having their maximum intensity component (e.g., the red, green, or blue component) at a particular color level (e.g., 0-255). In this example, histogram module 204 comprises 32 bins, each capable of counting the number of pixels associated with particular color levels. That is, each bin of the histogram operates to tally or count the maximum intensity component (e.g., red, green, or blue component) of each pixel associated with a particular frame of the processed signal. For example, bin "0" of a histogram operates to count the pixels having their maximum intensity component at a level between 0 and 7, while bin "31" operates to count the pixels having their maximum intensity components at a level between 248 and 255. In that example, bin "0" operates to count the number of dark pixels and bin "31" operates to count the number of bright pixels within the desired color level range. Although histogram module 204 implements thirty-two bins in this example, any desired number of bins may be used without departing from the scope of the present disclosure.

Control module 200 also includes a processor 206 having access to histogram module 204. Processor 206 also includes or has access to a memory capable of storing at least a target position table, an optical element position to gain table, a current background bin number, and a prior background bin number. In some cases, the memory is capable of storing data associated with an image intensity algorithm. For example, the memory can store values associated with a maximum number of clipped pixels, a target background pixel, "step sizes" associated with different conditions, a large movement threshold, a large bin change threshold, a large number of dark pixels threshold, and other values.

In this particular embodiment, processor 206 determines a target position of optical element 26 based on the data collected by histogram module 204 and a maximum number of pixels a manufacturer is willing to clip. In various embodiments, system manufacturers can set the maximum number of clipped pixels to, for example, ¼ or ½ of one percent of the total number of pixels associated with modulator 22. In a particular example embodiment, the maximum number of clipped pixels may be the $2048^{th}$ pixel. Processor 206 determines the target position of optical element 26 by first counting, starting in bin "31," the number of pixels until processor 206 determines the bin that contains the pixel that corresponds with the maximum number of clipped pixels. For example, if the maximum number of clipped pixels is set to 4096 and bin "31" has 800 pixels, bin "30" has 800 pixels, bin "29" has 1000 pixels, bin "28" has 1100 pixels, and bin "27" has 4000 pixels, then processor 206 determines that bin "27" has the $4096^{th}$ pixel. In that case, processor 206 sets the target bin to the position associated with bin "27" to ensure that the maximum number of clipped pixels is not exceeded.

In this example, processor 206, using the target bin value, accesses to a target position table to determine the target position of optical element 26. Table 1 provides one example of a target position table.

TABLE 1

| Target Position: | | | | | | | |
|---|---|---|---|---|---|---|---|
| 255, | 255, | 255, | 246, | 238, | 230, | 223, | 216, |
| 210, | 204, | 200, | 195, | 190, | 185, | 179, | 173, |
| 167, | 161, | 153, | 144, | 136, | 128, | 120, | 112, |
| 104, | 96, | 87, | 79, | 68, | 55, | 35, | 0, |

Table 1 includes 32 positions, each position corresponding to one of the 32 bins associated with histogram module 204. In this example, position "32" having a value of "0" corresponds to bin "31", position "25" having a value of "104" corresponds to bin "24", and position "24" having a value of "112" corresponds to bin "23". Where processor 206 determines that the target position should be set to the value associated with bin "28", processor 206 accesses the target position table and determines that the target position value is "68".

In this particular embodiment, processor 206 also determines the rate at which optical element 26 is adjusted based at least in part on the frame content of the current frame and the previous frame. In this example, for each frame processed by control module 200, processor 206 determines and stores a current background bin value and a prior background bin value. In most cases, device manufacturers determine a pixel value to set as the background pixel. In some cases, the background pixel value can be, for example, the $65{,}000^{th}$ brightest pixel. In other cases, the background pixel value can be, for example, the $32{,}000^{th}$ brightest pixel. Processor 206 determines the location of the background pixel within the bins associated with histogram module 204 by counting, starting in bin "31," the number of pixels until processor 206 determines the bin that contains the background pixel value.

After determining the bin that contains the current background pixel, processor 206 compares the current background bin to the preceding frame's background bin and determines the appropriate "step size" for the adjustable optical element 26. If processor 206 determines that the magnitude of the difference between the current and prior background bins is greater than a threshold value, then processor 206 determines that a background change has occurred and a maximum "step size" is appropriate. In some cases,. the background bin change threshold value can be, for example, three bins or more.

One aspect of this disclosure recognizes that when processor 206 determines that a background change has occurred, a large adjustment of the position of optical element 26 may not be detectable by a viewer of the scene. A background change typically occurs when the scene associated with the frame changes from dark scene (e.g., an indoor or night scene) to a bright scene (e.g., an outdoor or day scene). Any artifacts caused by the large movement of optical element 26 typically are undetected by the viewer as the viewer's eye adjusts to the new scene. On the other hand, if the background level is relatively constant, then a large adjustment of the position of optical element 26 may cause a small but visible flicker in brightness and a larger more noticeable change in black level.

In some cases, processor 206 determines that the magnitude of the difference between the current and prior background bins is less than the threshold value. In those cases, processor 206 seeks to minimize the "step sizes" at which optical element 26 moves in either the open or closed direction and determines that a smaller "step size" is appropriate. Selectively varying the position of optical element 26 by implementing relatively small "step sizes" reduces the potential for a flicker in the brightness associated with the displayed image or scene. In various embodiments, processor 206 can implement small "step sizes" that allow the aperture to reach its target position over several frames (e.g., 120 frames or more). In some cases, this can introduce a penalty in that more pixels may be clipped during the time optical element 26 takes to reach the target position.

In this particular embodiment, processor 206 also determines an amount of gain to apply to the processed signal received by gain module 208. In various embodiments, gain module 208 can comprise, for example, an amplifier capable of imparting a variable gain to the processed signal. In most cases, the amount of gain applied to the processed signal depends at least in part on the scene content and the maximum number of clipped pixels. In this example, processor 206 determines the amount of gain to apply to the processed signal received by gain module 208 based at least in part on a new position of optical element 26. Processor 206 determines the new position by summing the target position and the "step size" for optical element 26.

In this example, processor 206 determines the amount of gain to apply to the processed signal by accessing an optical element position to gain table. Table 2 provides one example of an optical element position to gain table.

TABLE 2

| Optical Element Position to Gain: | | | | | | | |
|---|---|---|---|---|---|---|---|
| 2048, | 2049, | 2050, | 2051, | 2052, | 2053, | 2055, | 2056, |
| 2057, | 2058, | 2060, | 2061, | 2063, | 2064, | 2066, | 2068, |
| 2069, | 2071, | 2073, | 2075, | 2077, | 2079, | 2081, | 2083, |
| 2085, | 2087, | 2090, | 2092, | 2094, | 2097, | 2099, | 2102, |
| 2105, | 2107, | 2110, | 2113, | 2116, | 2119, | 2121, | 2124, |
| 2127, | 2130, | 2134, | 2137, | 2140, | 2143, | 2147, | 2151, |
| 2154, | 2158, | 2162, | 2166, | 2171, | 2175, | 2180, | 2185, |
| 2189, | 2195, | 2200, | 2205, | 2210, | 2216, | 2221, | 2227, |
| 2233, | 2239, | 2245, | 2251, | 2258, | 2264, | 2271, | 2278, |
| 2286, | 2293, | 2301, | 2309, | 2318, | 2327, | 2336, | 2346, |
| 2356, | 2366, | 2376, | 2386, | 2397, | 2407, | 2418, | 2428, |
| 2439, | 2450, | 2460, | 2471, | 2482, | 2493, | 2503, | 2514, |
| 2526, | 2537, | 2548, | 2560, | 2572, | 2584, | 2597, | 2610, |
| 2623, | 2636, | 2649, | 2663, | 2677, | 2691, | 2705, | 2719, |
| 2734, | 2748, | 2763, | 2778, | 2793, | 2808, | 2823, | 2838, |
| 2853, | 2869, | 2885, | 2901, | 2917, | 2934, | 2950, | 2967, |
| 2984, | 3002, | 3019, | 3037, | 3055, | 3073, | 3091, | 3110, |
| 3128, | 3146, | 3165, | 3183, | 3201, | 3220, | 3238, | 3257, |
| 3276, | 3295, | 3314, | 3333, | 3352, | 3372, | 3392, | 3412, |
| 3433, | 3454, | 3475, | 3497, | 3520, | 3544, | 3568, | 3594, |
| 3620, | 3648, | 3677, | 3707, | 3739, | 3773, | 3808, | 3844, |
| 3882, | 3920, | 3960, | 4001, | 4044, | 4087, | 4130, | 4175, |
| 4220, | 4266, | 4312, | 4360, | 4409, | 4460, | 4512, | 4567, |
| 4624, | 4683, | 4746, | 4811, | 4881, | 4955, | 5032, | 5114, |
| 5200, | 5290, | 5384, | 5482, | 5584, | 5690, | 5799, | 5913, |
| 6030, | 6151, | 6275, | 6402, | 6532, | 6666, | 6803, | 6942, |
| 7085, | 7230, | 7377, | 7526, | 7677, | 7829, | 7983, | 8138, |
| 8294, | 8453, | 8615, | 8779, | 8947, | 9119, | 9297, | 9480, |
| 9670, | 9868, | 10075, | 10291, | 10517, | 10754, | 11001, | 11259, |
| 11529, | 11811, | 12105, | 12411, | 12731, | 13065, | 13413, | 13774, |
| 14151, | 14542, | 14948, | 15369, | 15805, | 16256, | 16383, | 16383, |
| 16383, | 16383, | 16383, | 16383, | 16383, | 16383, | 16383, | 16383, |

In this example, table 2 includes 256 positions, each position corresponds to a position of optical element 26. To determine the gain associated with a given position, processor 206 divides the value associated with the position by a value of 2048. In one example, processor 206 determines that the new position of optical element 26 after adjustment results in integrator rod 17 receiving 100% of projection light emitted from light source 12. The first entry of optical element position to gain table notates this new position with a value of "2048." In that case, processor 206 causes gain module 208 to impart a gain of "1" to the processed signal. In another example, processor 206 determines that the new position of optical element 26 results in integrator rod 17 receiving approximately 50% of the projection light emitted from light source 12 and that position "174" having a value of "4087" corresponds to that new position. In that case, processor 206 causes gain module 208 to impart a gain of "1.995" to the processed signal.

Control module 200 also includes a formatter 210 capable of formatting the amplified signal before communicating the amplified signal to modulator 22. In this particular example, processor 206 identifies a number of clipped pixels based at least in part on histogram module 204. In most cases, after amplification, each of the clipped pixels will generate a color that is different from the color that was intended to be displayed. As described above, the clipped pixels generate a different color because the clipped pixels typically generate a hue that is substantially different from a hue that was intended. Moreover, the displayed color will be desaturated (e.g., having washed out appearance). To minimize the impact of clipped pixels on a displayed image, formatter 210 implements a hue correction algorithm that ensures the clipped pixels are maintained in the desired hue of the intended color.

In a particular embodiment, formatter 210 may have access to or includes a memory capable of storing a hue correction algorithm. In various embodiments, the hue correction algorithm may be capable of correcting the hue of the clipped pixels to its originally intended hue. In those embodiments, the actual color displayed may differ from the intended color because the hue correction algorithm may adjust the saturation to be different than was intended. By correcting the hue and adjusting the saturation, the pixel will produce a portion of the image at or near the same brightness as the remainder of the displayed image. In other embodiments, the hue correction algorithm is capable of returning the hue and the saturation of the clipped pixel to their original values, which displays the exact color intended. By returning the hue and saturation to their original values, the pixel will produce a portion of the image at a brightness that is less than the remainder of the displayed image.

In operation, control module 200 operates to determine the appropriate position of optical element 26 and the appropriate gain for a given frame based on the content of the preceding frame. In various embodiments, control module 200 determines the rate at which the position of optical element 26 is adjusted based at least in part on the frame content of the current frame and the previous frame. In most cases, control module 200 seeks to minimize the "step sizes" at which optical element 26 is adjusted. Moreover, control module 200 seeks to determine the position of optical element 26 that results in the maximum gain without exceeding the maximum number of clipped pixels and without introducing objectionable artifacts. In one example, control module 200 determines that the current frame is brighter than the preceding frame and the gain applied by gain module 208 is too high for the current frame. In that case, processor 206 operates to cause the adjustment of optical element 26 to result in more light being received by integrator rod 17. Accordingly, the gain applied by gain module 208 is reduced. In another example, control module 200 determines that the current frame is darker than the preceding frame and that the gain applied by gain module 208 is too low for the current frame. In that case, processor 206 operates to cause the adjustment of optical element 26 to result in less light being received by integrator rod 17, and the gain applied by gain module 208 increases.

Figure 3A:
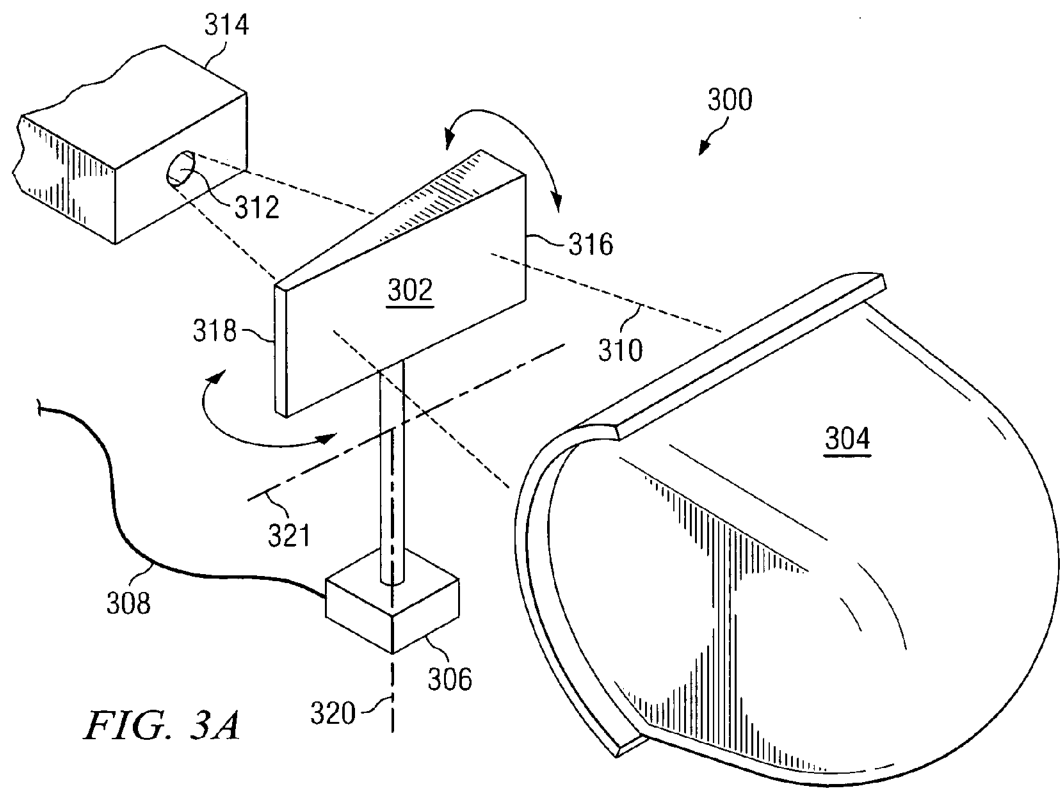
FIGS. 3A and 3B illustrate one example of an optical element and the effect of adjusting the position of the optical element to modulate light from a source.
Figure 3B:
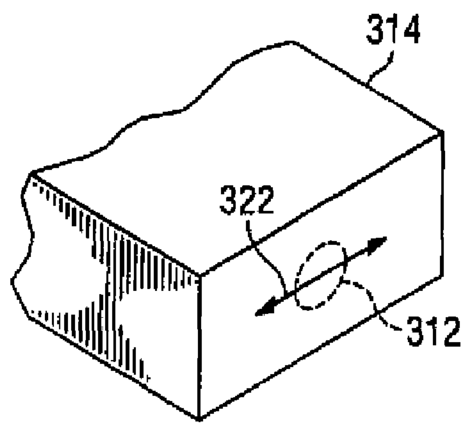

FIGS. 3A and 3B illustrate one example of an optical system 300 and the effect of adjusting the position of an optical element 302 to modulate light from a light source 304. Optical element 302 is one example embodiment of optical element 26, which is discussed above with regard to FIG. 1. In this illustrated system, optical system 300 includes a control motor 306 capable of receive a control signal 308 from a control module (not explicitly shown) and manipulating adjustable optical element 302. The structure and function of control motor 306 may be substantially similar to the structure and function of control motor 28 of FIG. 1. In this example, control motor 306 comprises a trapezoidal voice coil motor that is capable of 256 step changes and is capable, at maximum speed, of transitioning through the 256 steps in approximately 16 milliseconds.

In particular embodiments, adjustable optical element 302 comprises a thin window or lens that operates to manipulate and/or vary an amount of projection light 310 received by an entrance 312 of an integrator rod 314. Optical element 302 is preferably comprised of glass or another at least partially transmissive material. In the illustrated embodiment, optical element 302 is wedge shaped such that a first end 316 of optical element 302 is wider than a second end 318 of optical element 302. The wedged shape of optical element 302 may also operate to shift the focal light of projection light 310 spatially across the entrance 312 of an integrator rod 314.

Because projection light 310 transmitted from light source 304 must pass through optical element 302, the shape and refractive properties of optical element 302 and the position of optical element 302 relative to integrator rod 314 influence the projection of light 310. For example, the position of optical element 302 may be adjusted to manipulate where the focal point of projection light 310 strikes integrator rod 312. For images requiring a brighter contrast (e.g., daylight scenes), optical element 302 may be positioned to result in the focal point being substantially aligned with entrance 312 of integrator rod 314. By contrast, for images requiring a darker contrast (e.g., night scenes), optical element 302 may be positioned to result in the focal point being displaced some amount from entrance 312 such that some but not all of projection light 310 is received by entrance 312 of integrator rod 314.

As discussed above, control motor 306 and a control module may cooperate to control the adjustment of the focal point of projection light 310 relative to entrance 312. In particular embodiments, control motor 306 and the control module may operate to rotate optical element 302 about a first axis 320 or about a second axis 321. For example, in a first position, optical element 302 may be positioned such that projection light 310 is directed through optical element at an angle that results in the focal point of projection light 310 corresponding generally with entrance 312 of integration rod 314. Accordingly, the maximum throughput of projection light 310 transmitted from light source 304 may be received by integrator rod 314, and a brighter image may be projected.

A second position of optical element 26 may be obtained when optical element 302 is rotated about first axis 320 or second axis 321 by a step size. As a result of the rotation of optical element 26, however slight, the focal point of projection light 310 may manipulated such that the focal point is slightly to the left or slightly to the right of entrance 312 along a focal path 322, as is illustrated in FIG. 3B. As a result of the displacement of the focal point, the throughput of projection light 310 received by integrator rod 314 may be diminished, and a darker image projected. In various embodiments, the amount by which the throughput of projection light 310 is diminished is dependent upon the black levels desired for the image to be projected. For a darker image, a greater black level is desired. The darker the image to be projected the less projection light 310 may be allowed to enter entrance 312 of integrator rod 314.

In this manner, the light emitted from light source 304 may be modulated without impacting the output of light source 304. Such a modulation is desirable where light source 304 includes an arc lamp or other AC light source that requires a current waveform of a specific nature to remain in operation. For example, plasma field arc lamps require a minimum amount of current. When the level of current driving the lamp falls below the minimum amount of current required to operate the lamp, the lamp will extinguish. Accordingly, such light sources 304 require steady state operation to preserve the life of light sources 304.

In particular embodiments, optical element 302 may additionally or alternatively operate to filter projection light 310. For example, it may be desirable for optical element 302 to filter ultra-violet or infrared light. Additionally or alternatively, if selective modulation of a particular color is desired, optical element 302 may be coated or otherwise configured to reflect a certain color by adjusting the hue of the projected light and by changing the color gamut.

Modifications, additions, or omissions may be made to optical element 302 without departing from the scope of the invention. For example, although optical element 302 is described as including a transmissive element, it is recognized that optical element 302 may include any element that operates to allow varying amounts of projection light 310 to be received at entrance 312. Accordingly, optical element 302 may include a mirror or other object that operates to redirect light. Furthermore, while a wedge shaped element is described above, it is generally recognized that optical element 302 may be of any shape desired for the performing the modulation of projection light 310. For example, in some embodiments, optical element 302 may include a prism with parallel planes. As still another modification, where a light source emits projection light beams that are focused and uniform, optical system 300 may not include integrator rod 314. In such embodiments, merely an aperture 312 may be used to adjust the angles of the light to be received by modulator 22.

Figure 4:
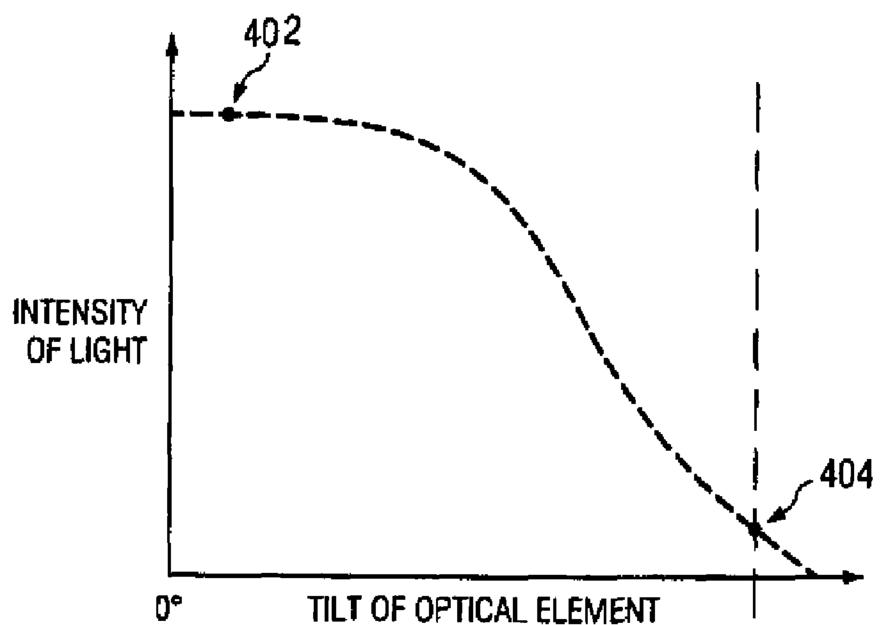
FIG. 4 is a graph illustrating the effect of adjusting a position of an optical element on the intensity of light received by an integrator.

FIG. 4 is a graph illustrating the intensity of light received by an integrator rod as a function of the position of an optical element. The structure and function of the optical element may be substantially similar to the structure and function of optical element 302 of FIG. 3A. Accordingly, when the optical element is positioned in a first position 402, a maximum amount of the throughput from the light source may be received by the entrance of an integrator rod. As a result, a brighter image may be depicted. When the optical element is positioned in a second position 404, however, a minimum amount of throughput from the light source may be received by the entrance of the integrator rod. While the maximum amount at position 402 may be a function of the maximum intensity available from the light source, the minimum intensity at position 404 may be a function of the minimum amount of light that must be received by a modulator to result in a projected image.

Although only first and second positions 402 and 404 are depicted in FIG. 4, the positioning of the optical element is not limited to first and second positions 402 and 404. Rather, the optical element may be positioned at any tilted or untilted position that results in light received by the integrator rod of an intensity between the maximum intensity level allowable by the light source and the minimum intensity level required by the image data. Accordingly, the optical element may be positioned at any of a variety of positions to result in varying intensities of light being received by the modulator. As described above, the desired intensities of light may vary on a frame-by-frame basis as is determined by a control module using an image intensity algorithm.

Figure 5:
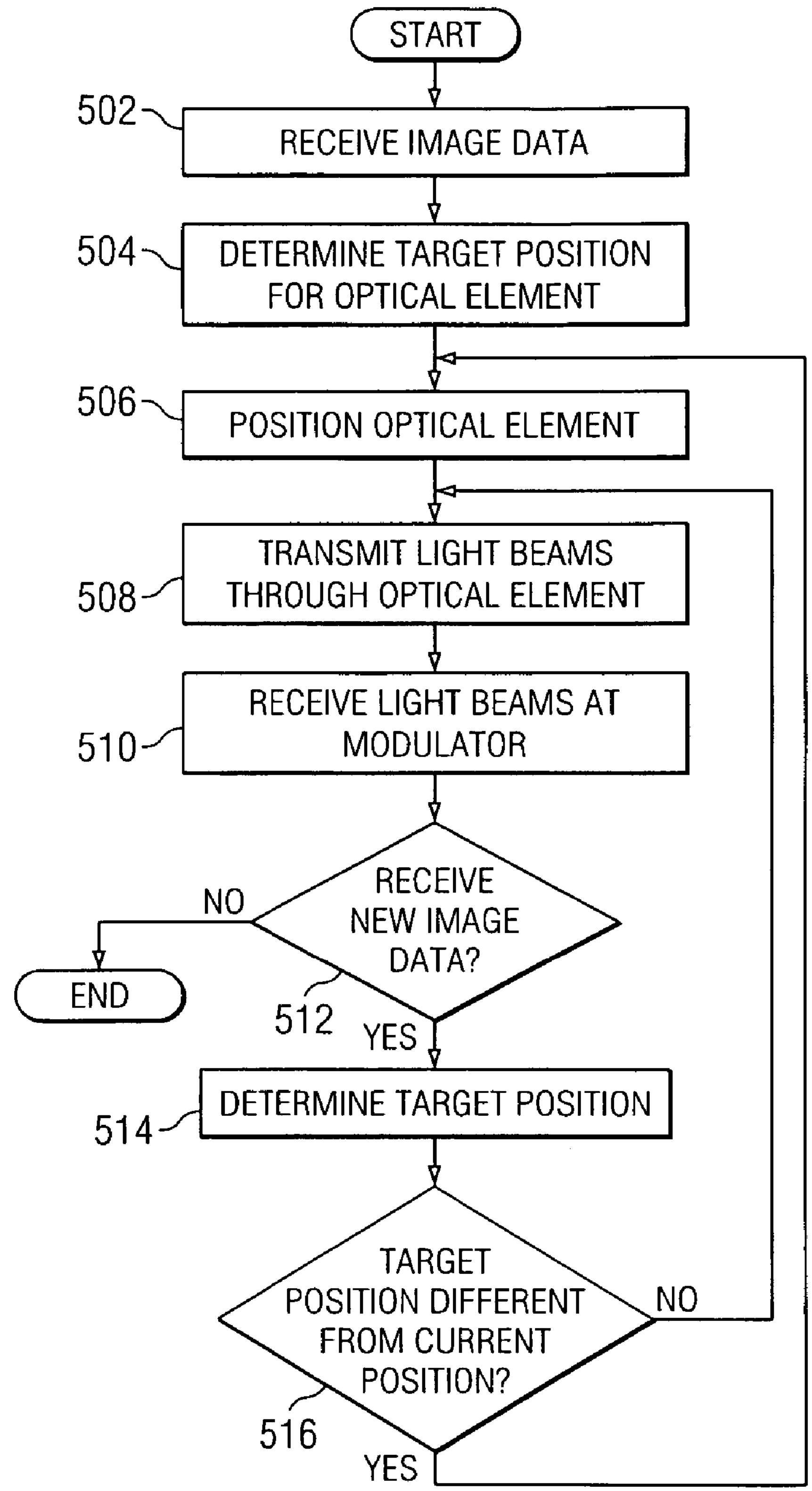
FIG. 5 is a flow chart of a method of adjusting a position of an optical element.

FIG. 5 is a flow chart of a method for adjusting a position of an optical element. At step 502, image data 38 is received by control module 30 of image display system 10. In particular embodiments, image data 38 may be received from a communications device and may include image content, color content, integrated intensity of the image frame, a peak to peak intensity value of the image frame, and/or a subjectively weighted area, such as the center of the image. Image data 38 may be used by control module 30 to determine a target position for optical element 26 at step 504.

At step 506, optical element 26 may be positioned in the target position. In particular embodiments, control module 30 may operate to control the position of optical element 26. Specifically, control motor 28, which may receive control signal 42 from control module 30, may position optical element 26 in the target position. In various embodiments, the target position may be relative to integrator rod 17 and, more specifically, relative to an entrance of integrator rod 17.

A plurality of light beams are transmitted through optical element 26 at step 508. In particular embodiments, the plurality of light beams may include projection light emitted from light source 12. The projection light may be transmitted through optical element 26 while in route to integrator rod 17 or another element of display system 10. The refractive properties of optical element 26 may cause the modulation of the projection light such that the amount of projection light that is received by integrator rod 17 or another receiving element of display system 10 is varied based upon the position of optical element 26 as the projection light is transmitted through optical element 26.

At step 510, the modulated light beams are received at modulator 22. In particular embodiments, modulator 22 may include a device selected from a group consisting of a digital micro-mirror device, a reflective liquid crystal modulator, and a light emitting diode modulator. When in an "on" state, modulator 22 may transmit at least a portion of the modulated light along projection path 34 to projection lens 24. Projection lens 24 may then operate to display an image. Conversely, when in an "off" state, modulator 22 may transmit at least a portion of the modulated light to a light dump.

At step 512, a determination may be made as whether new image data is received. Where such image data is not received, the method may terminate. Conversely, where such image data is received, a new target position for optical element 26 may be determined based at least in part on the new image data received at step 514. In particular embodiments, new image data may be received on a frame-by-frame basis. In other embodiments, new image data may be received on a multiple frames-by-multiple frames basis.

A determination may be made as to whether the new target position is different from the current position of optical element 26 at step 516. Where the new target position and the current position are the same, the method may return to step 508 where light beams are transmitted through optical element 26. Alternatively, where the new target position and the current position are not the same, the method may return to step 506 and optical element 26 may be repositioned. Following the repositioning of optical element 26, the plurality of light beams may be transmitted through the repositioned optical element 26. The method may continue by cycling through steps 506 to 516 until, new image data is not received, at which time the method terminates.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. An image display system comprising:

a light modulator comprising an array of micro-mirror devices, the modulator operable to receive a plurality of light beams;

a light source operable to generate the plurality of light beams;

a wedge-shaped optical element positioned between the light source and an integrator rod, the optical element having refractive properties operable to selectively vary an amount of the plurality of light beams that is received by the integrator rod;

a control module operable to control a position of the optical element based at least in part on image data received from a communication device; and a control motor operable to receive a control signal and to selectively manipulate the optical element.

2. An image display system comprising:

a light modulator operable to receive a plurality of light beams;

a light source operable to generate the plurality of light beams; and an optical element positioned between the light source and the modulator, the optical element operable to selectively vary an amount of the plurality of light beams that is received by the modulator;

a control module operable to control a position of the optical element based at least in part on image data received from a communication device; and a control motor operable to receive a control signal and to selectively manipulate the optical element; and wherein the control module includes a histogram that collects image data and determines a target position for the optical element.

3. The system of claim 2, wherein the modulator comprises a device selected from a group consisting of a digital micro-mirror device, a reflective liquid crystal modulator, and a light emitting diode modulator.

4. The system of claim 2, wherein the optical element is comprised of glass and is wedge shaped.

5. The system of claim 2, wherein the optical element is at least partially transmissive and has refractive properties that operate to selectively modulate the plurality of light beams.

6. The system of claim 2, wherein the optical element selectively varies the amount of the plurality of light beams based at least in part on image data.

7. The system of claim 2, further comprising an integrator rod positioned between the optical element and the modulator, and wherein selectively varying the amount of the plurality of light beams comprises selectively varying the amount of the plurality of light beams that is received by the integrator rod.

8. The system of claim 7, wherein:

the integrator rod comprises an entrance; and selectively varying the amount of the plurality of light beams comprises selectively varying the amount of the plurality of light beams that is received by the entrance of the integrator rod.

9. An image display system comprising:

a light modulator operable to receive a plurality of light beams;

a light source operable to generate the plurality of light beams; and an optical element positioned between the light source and the modulator, the optical element operable to selectively vary an amount of the plurality of light beams that is received by the modulator;

a control module operable to control a position of the optical element based at least in part on image data received from a communication device; and a control motor operable to receive a control signal and to selectively manipulate the optical element; and wherein the control module includes a target position table to determine a target position for the optical element.

10. The system of claim 9, wherein the modulator comprises a device selected from a group consisting of a digital micro-mirror device, a reflective liquid crystal modulator, and a light emitting diode modulator.

11. The system of claim 9, wherein the optical element is comprised of glass and is wedge shaped.

12. The system of claim 9, wherein the optical element is at least partially transmissive and has refractive properties that operate to selectively modulate the plurality of light beams.

13. A method for modulating light in an image display system, comprising:

generating a plurality of light beams;

receiving image data from a communication device;

with an optical element, selectively varying an amount of the plurality of light beams that is received by a modulator based at least in part on the image data;

receiving the selectively varied amount of the plurality of light beams at the modulator;

selectively manipulating a position of the optical element based at least in part on the image data received from the communication device; and determining a target position for the optical element based at least in part on the image data received from the communication device.

14. The method of claim 13, wherein receiving the selectively varied amount of the plurality of light beams at the modulator comprises receiving the selectively varied amount of the plurality of light beams at a device selected from a group consisting of a digital micro-mirror device, a reflective liquid crystal modulator, and a light emitting diode modulator.

15. The method of claim 13, wherein the step of selectively varying comprises transmitting the plurality of light beams through a wedge shaped piece of glass.

16. The method of claim 13, further comprising positioning an integrator rod between the optical element and the modulator.

17. The method of claim 16, wherein selectively varying the amount of the plurality of light beams comprises selectively varying the amount of the plurality of light beams that is received by the integrator rod.

18. A method for modulating light in an image display system, comprising:

generating a plurality of light beams;

using an optical element, selectively varying an amount of the plurality of light beams that is received by a modulator; and receiving the selectively varied amount of the plurality of light beams at the modulator;

selectively manipulating a position of the optical element based at least in part on image data received from a communication device; and determining a target position for the optical element from a target position table.

19. An image display system comprising:

a light modulator operable to receive a plurality of light beams;

a light source operable to generate the plurality of light beams; and an optical element positioned between the light source and the modulator, the optical element operable to selectively vary an amount of the plurality of light beams that is received by the modulator and wherein the optical element is comprised of glass and is wedge shaped.

20. The system of claim 19, wherein the modulator comprises a device selected from a group consisting of a digital micro-mirror device, a reflective liquid crystal modulator, and a light emitting diode modulator.

21. The system of claim 19, wherein the optical element is at least partially transmissive and has refractive properties that operate to selectively modulate the plurality of light beams.

22. An image display system, comprising:

a light source for generating a plurality of light beams;

a modulator;

an optical element for selectively varying an amount of the plurality of light beams that is received by the modulator, wherein the optical element is for selectively varying the amount based at least in part on image data received from a communication device; and means for determining a target position for the optical element based at least in part on the image data received from the communication device.

23. A method for modulating light in an image display system comprising an array of micro-mirror devices, the modulator operable to receive a plurality of light beams, comprising:

with a light source, generating a plurality of light beams;

with a wedge-shaped optical element positioned between the light source and an integrator rod, selectively varying an amount of the plurality of light beams that is to be received by the integrator rod;

controlling a position of the optical element based at least in part on image data received from a communication device; and operating a control motor to receive a control signal and to selectively manipulate the optical element.

24. A method for modulating light in an image display system, comprising:

generating a plurality of light beams;

selectively varying an amount of the plurality of light beams that is received by a modulator by transmitting the plurality of light beams through an optical element; and receiving the selectively varied amount of the plurality of light beams at the modulator; and wherein transmitting the plurality of light beams through the optical element comprises transmitting the plurality of light beams through a wedge shaped piece of glass.

* * * * *